United States Patent [19]

Delgado, Jr.

[11] Patent Number: 4,717,187

[45] Date of Patent: Jan. 5, 1988

[54] APPARATUS FOR IMPARTING ROTATIONAL MOVEMENT TO A WORK OBJECT AND THE LIKE

[75] Inventor: Daniel Delgado, Jr., Hanford, Calif.

[73] Assignee: Dennis M. Scamardo, Hanford, Calif.

[21] Appl. No.: 946,833

[22] Filed: Dec. 29, 1986

[51] Int. Cl.[4] .......................... B25B 13/50; B65G 7/12

[52] U.S. Cl. ...................................... 294/17; 81/90.9; 254/119; 294/26

[58] Field of Search ..................................... 294/15-18, 294/26, 92, 103.1, 104; 81/90.1, 90.9, 119, 120, 126; 254/44, 94, 113, 119-121, 123, 129, 131

[56] References Cited

U.S. PATENT DOCUMENTS

| | | | |
|---|---|---|---|
| 240,609 | 4/1881 | Peasley | 294/17 |
| 771,451 | 10/1904 | Ashworth | 81/90.9 |
| 788,560 | 5/1905 | Smith et al. | 294/17 X |
| 1,302,461 | 4/1919 | Adamson | 294/15 |
| 1,758,052 | 5/1930 | Missman | 254/119 |
| 1,970,403 | 8/1934 | Sorensen | 81/90.1 |
| 2,069,976 | 2/1937 | Sehon | 81/119 X |
| 2,682,189 | 6/1954 | Bergman | 81/119 |
| 4,013,313 | 3/1977 | Gardels | 294/17 |
| 4,368,874 | 1/1983 | Weisgerber | 294/17 X |
| 4,380,326 | 4/1983 | Marzorati et al. | 254/131 |

FOREIGN PATENT DOCUMENTS

| | | | |
|---|---|---|---|
| 36090 | 1/1914 | Sweden | 294/16 |
| 177190 | 11/1961 | Sweden | 294/17 |

*Primary Examiner*—Johnny D. Cherry
*Attorney, Agent, or Firm*—Worrel & Worrel

[57] ABSTRACT

Apparatus for imparting rotational movement to a work object and the like which includes a force transmitting member mounting a pressure plate disposed at its distal end, and an adjustable capture assembly having a cradle is mounted on the force receiving member to facilitate the transmission of force to the work object to urge it to rotate in a predetermined direction.

5 Claims, 4 Drawing Figures

APPARATUS FOR IMPARTING ROTATIONAL MOVEMENT TO A WORK OBJECT AND THE LIKE

BACKGROUND OF THE INVENTION

1. Field of the Invention:

The present invention relates to an apparatus for imparting rotational movement to a work object and the like and more particularly to such an apparatus which is adapted to impart rotational movement to a cotton picker drum having a doffer assembly and which is adapted to transmit force to such an assembly to urge it to rotate in a predetermined direction for the purpose of extracting foreign objects which interfere with the operation of the cotton picker drum; the apparatus being relatively inexpensive to construct and maintain and which affords the optimum conditions for rotating variously dimensioned doffer assemblies and the like in a wide range of operative environments.

2. Description of the Prior Art:

As is well known, the prior art is replete with variously designed cotton picker drums which are mounted on cotton harvesters for the purpose of extracting cotton fibers from the open bolls of cotton plants. As a general matter, the cotton picker drum units typically have two doffer assemblies and a spindle picker bar mounted for rotational movement internally of each of the picking drum units.

From time to time during the routine operation of a cotton harvester, operators have by accident, oversight, or negligence operated these devices in such a fashion that foreign objects have become lodged in the cotton picking drum units. More particularly, it has from time to time been the case that an operator or other field hand has accidentally become impaled internally of the cotton picking drum units when they have been engaged in clearing obstructions from the picking drum unit or performing assorted maintenance tasks in the vicinity of such subassembly.

In these unfortunate, and potentially fatal situations, rescue personnel have faced a dilemma concerning their possible courses of action, inasmuch as a commonly accepted approach for extracting these victims was not available. This has been attributable, in large measure, to the assorted mechanical configurations that commercially available cotton harvesters have taken. In some of these situations, rescue personnel, police, or others have approached the problem of extracting a victim from their perilous position internally of the cotton picking drum unit by prying open or otherwise disassembling such subassembly. As should be understood, this procedure occasionally has required a time of three to four hours and a variety of assorted tools. As could be expected, this method of extraction was quite undesirable inasmuch as the time delay was from time to time fatal to the stricken victim. Moreover, if the obstruction that was stuck in the cotton picker drum unit was an inanimate object, this approach to remove the obstruction often contributed to an increase in the mechanical down time for the cotton harvester involved.

Farmers and rescue personnel have developed and currently employ a common approach to address the problem of extracting a victim or other object out of the cotton picker drum assemblies with increased speed. To accomplish this task force is applied to the doffer assembly to turn it backwards thus permitting the removal of the injured person or other obstructions lodged in the device. While this has now become the newly accepted method of extraction, it has not proven to be a completely satisfactory answer to the problem of removing a victim or other obstruction rapidly from a cotton picker drum unit inasmuch as rescue personnel and others have had no single readily available tool which conveniently could be employed on all makes and models of cotton harvesters. Thus rescue personnel and others were required to carry a variety of conventional hand tools in the event they were called upon to extract a victim or other obstruction from any number of assorted models and designs of cotton harvesters.

Therefore, it has long been known that it would be desirable to have an apparatus for imparting rotational movement to a work object and the like; and more particularly to an apparatus which mounts an adjustable capture assembly which selectively engages and transmits force to a doffer assembly for the purpose of imparting rotational movement thereto in a predetermined direction.

OBJECTS AND SUMMARY OF THE INVENTION

Therefore, it is an object of the present invention to provide an improved apparatus for imparting rotational movement to a work object and the like.

Another object is to provide such an apparatus which is adapted to transmit force to a doffer assembly for the purpose of releasing an obstruction which has become lodged internally of the cotton picker drum unit.

Another object is to provide such an apparatus which mounts a capture assembly which can be easily adjusted to a multiplicity of positions for the purpose of engaging a variety of variously dimensioned doffer assemblies.

Another object is to provide such an apparatus which can be rapidly assembled and dependably operated by hand to impart rotational movement to a doffer assembly while simultaneously possessing the capability of being easily disassembled and transported in a stored configuration.

Another object is to provide such an apparatus which is characterized by ease of employment, simplicity of construction, substantially care-free maintenance and which can be manufactured and sold at nominal expense.

Further objects and advantages are to provide improved elements and arrangements thereof for an apparatus for the purposes described which is dependable, economical, durable and fully effective in accomplishing its intended purposes.

These and other objects are achieved in an apparatus for imparting rotational movement to a work object and the like of the present invention wherein in the preferred embodiment, the apparatus has a handle disposed therebetween two inwardly convergent support members, the support members mounting at their distal end a pressure plate which is positioned for rested mating engagement with the work object to be rotated; and an adjustable capture assembly is mounted therebetween the inwardly convergent support members, the adjustable capture assembly engaging the work object to be rotated for the purpose of transmitting force to the work object to urge it to rotate in a predetermined direction.

DESCRIPTION OF THE PREFERRED EMBODIMENT

Figure 2:
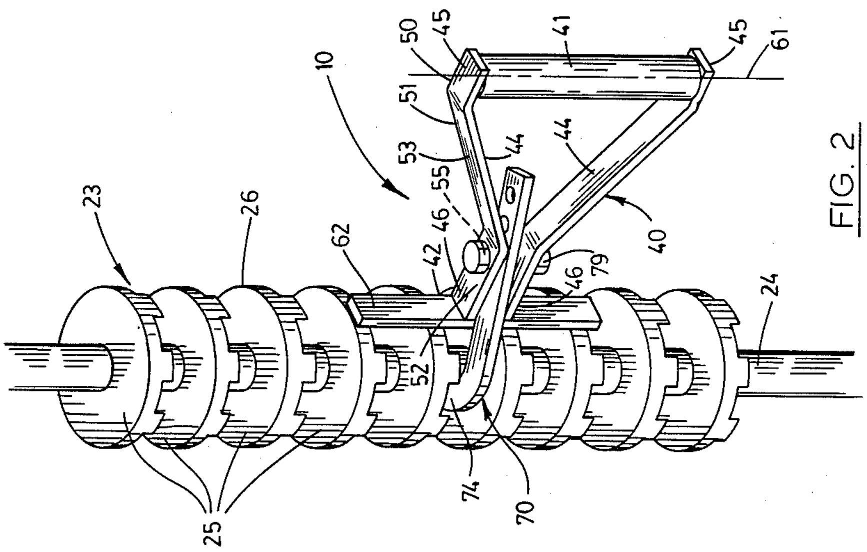
FIG. 2 is a somewhat enlarged, fragmentary, perspective view of the apparatus of the subject invention engaging the doffer assembly of a cotton harvester.
Figure 1:
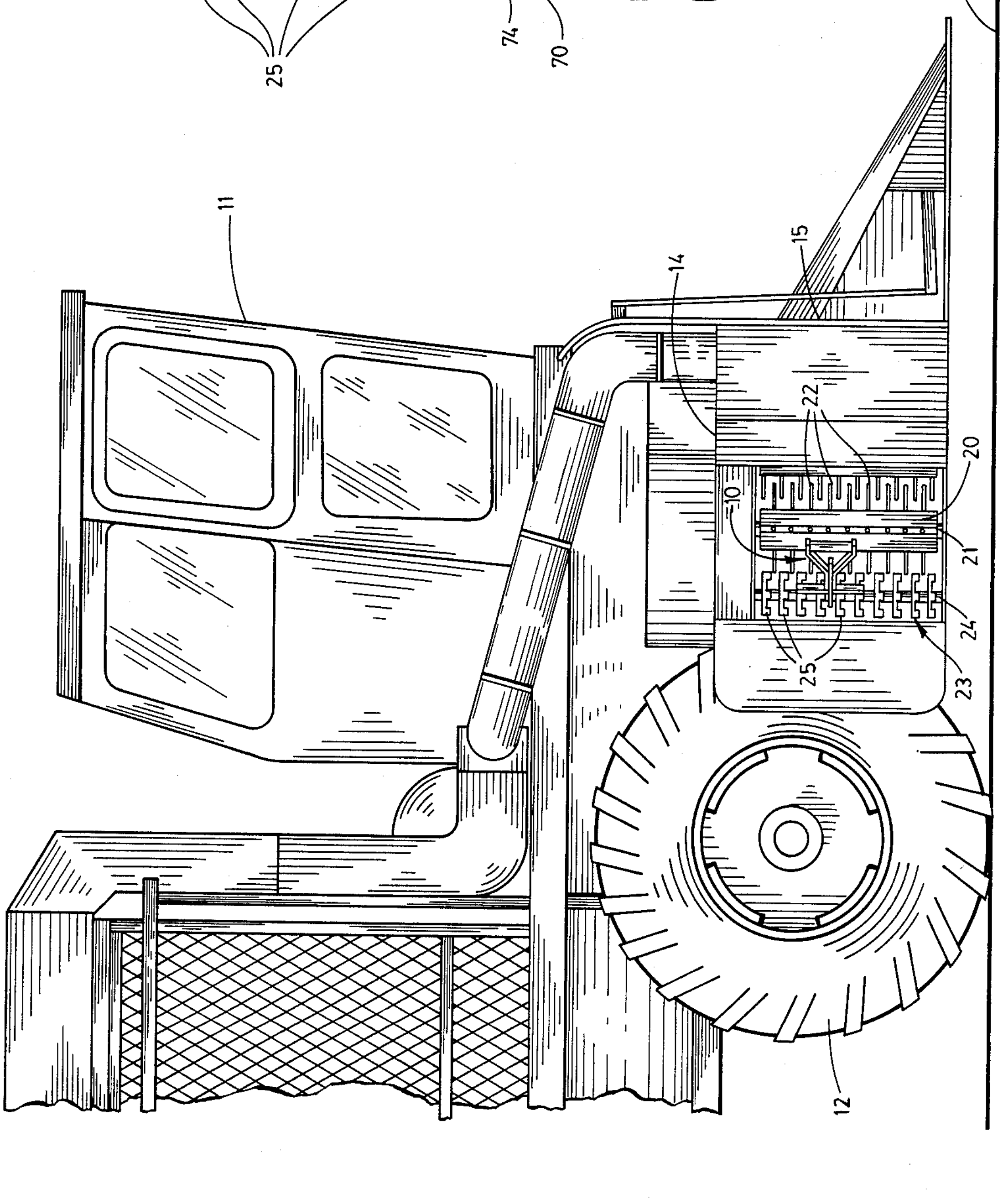
FIG. 1 is a side elevation of an apparatus for imparting rotational movement to a work object and the like of the present invention shown in a typical operative configuration engaging the doffer assembly of a conventional cotton harvester.

Referring more particularly to the drawings, the apparatus for imparting rotational movement to a work object and the like embodying the principles of the present invention is generally indicated by the numeral 10 in FIG. 2. For illustrative convenience, the apparatus is shown and described herein in a typical operative environment. More specifically, as shown in FIGS. 1 and 2, the apparatus of the present invention is shown operatively engaging a doffer assembly which is mounted internally of a conventionally designed cotton harvester 11. The harvester has ground engaging wheels 12 which urge the cotton harvester over the surface of the earth 13, and a plurality of cotton picking drum units 14, only one of which is shown, which each has a crop inlet 15 and a channel, not shown, which is formed internally of the cotton picking drum units which permit a row of cotton plants, not shown, to travel therethrough.

The cotton picking drum units 14 of the cotton harvester 11 are of conventional configuration having a vertically disposed rotatable spindle picker bar 20 which has an axle 21. The axle 21 mounts a plurality of spindles indicated by the numeral 22, which operate in a manner familiar to those skilled in the art inasmuch as the picker bar 20 rotates and is urged through a cotton plant to "wrap" the cotton fibers of open bolls on the cotton plant for the purpose of stripping the cotton fibers from the open bolls while simultaneously leaving trash and green bolls undisturbed. The spindles 22 are mounted for operative engagement with a doffer assembly generally indicated by the numeral 23. The doffer assembly has an axle 24 which is rotated by the action of a chain drive, not shown, which is set in motion by the engine of the cotton harvester 11, not shown. The doffer assembly mounts in an equidistant attitude along the axle 24 a plurality of doffer plates 25, which are of conventional design, consisting of a rubber cheated plate which operates to strip the cotton fibers "wrapped" by the spindles 22 straight back over the surface of the spindle and thereafter drop the cotton fibers into a conveyor system for movement to a collection bin. As should be appreciated, the rotation of the doffer assembly causes a corresponding rotation of the picker bar 20. The doffer assembly has a peripheral edge indicated by the numeral 26.

Figures 3, 4:
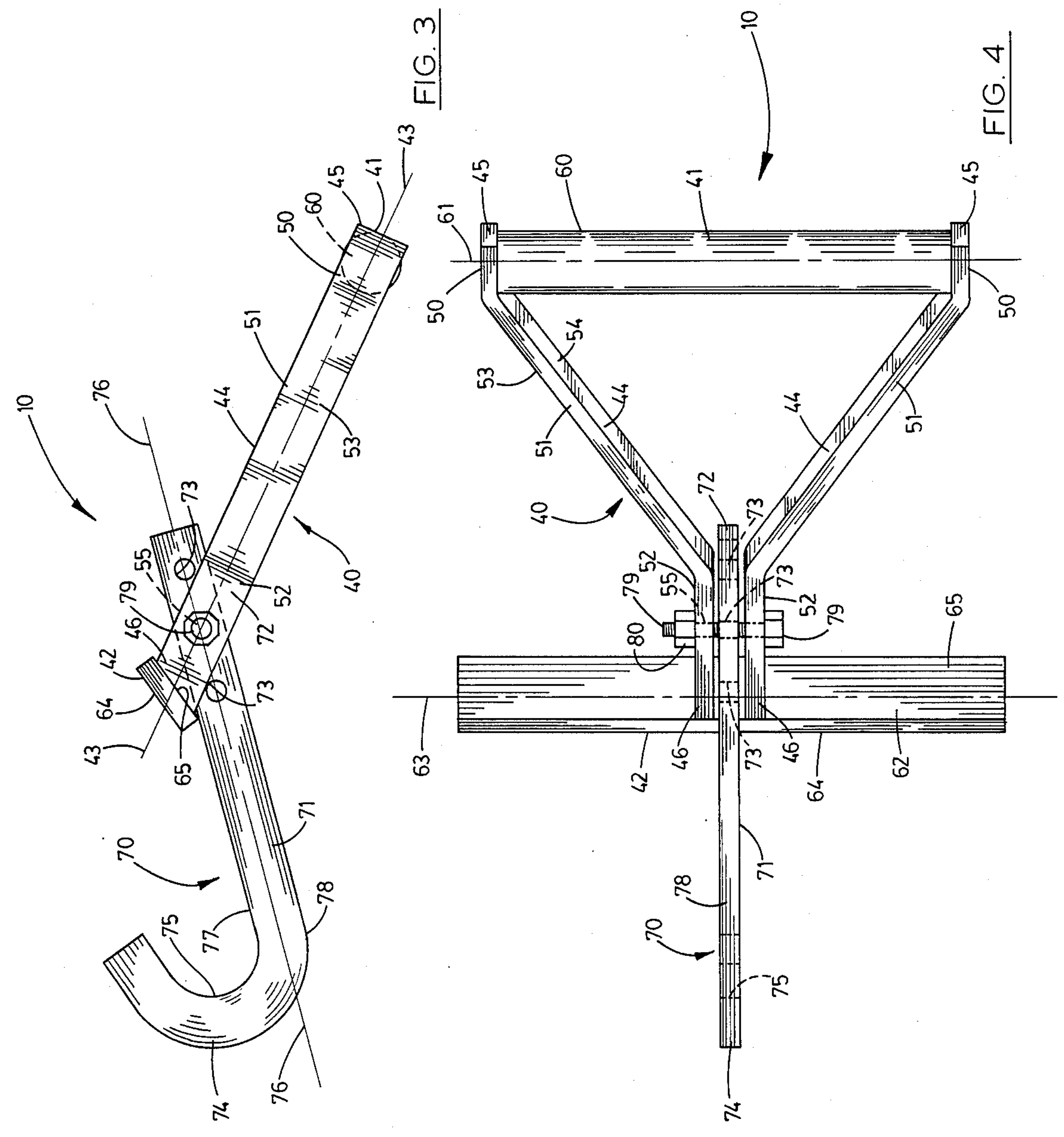
FIG. 3 is a somewhat enlarged, plan view of the apparatus of the subject invention.
FIG. 4 is a side elevation of the apparatus of the subject invention.

As best seen by reference to FIG. 4, the apparatus 10 has a force transmitting member generally indicated by the numeral 40, which has opposite first and second ends designated 41 and 42, respectively. The force transmitting member has a longitudinal axis 43 and a pair of inwardly convergent support members 44. Each of the inwardly convergent support members has a proximal end 45 and a distal end 46. The pair of inwardly convergent support members each has a first course 50, a second course 51, and a third course 52. The inwardly convergent support members also have an outside or external surface 53 and an internal surface 54. As shown most clearly by reference to FIGS. 3 and 4, an orifice 55 is formed therethrough the pair of inwardly convergent support members in a location approximately centrally of the third course 52; it being understood that the orifice 55 defines a bolt receiving station which screw-threadably receives a bolt of predetermined dimensions which will hereinafter be described in greater detail.

A handle 60 is mounted therebetween the first and second course 50 and 51 at the proximal end 45 of the force transmitting member 40. The handle 60 has a longitudinal axis which is generally indicated by the line labeled 61. A pressure plate 62 having a longitudinal axis 63 is affixed by welding or the like in secure facing engagement at the distal end 46 of the inwardly convergent pair of support members 44. The pressure plate is mounted at a slightly oblique attitude with respect to the longitudinal axis 43 of the force receiving member 40, and in parallel spaced relationship to the longitudinal axis 61 of the handle 60. The pressure plate has an interior surface 64 which is adapted to engage the peripheral edge 26 of the doffer assembly 23 when the apparatus is properly employed for the purpose of imparting rotational movement to the doffer assembly. Furthermore, and as best seen by reference to FIG. 2, the pressure plate 62 has a length dimension which is substantially equal to or greater than the distance between two adjoining doffer plates 25.

A capture assembly 70 is screw-threadably mounted on the force transmitting member 40. The capture assembly has an alongated main body 71 which has a proximal end 72 which has formed therein a plurality of bolt receiving apertures or orifices 73 that are positioned in predetermined spaced relation along the elongated main body, and a distal end 74, which has formed therein a cradle 75. The elongated main body further has a length dimension which is greater than the radius dimension of the doffer plates 25. This is best illustrated by reference to FIG. 2. The cradle is adapted to engage the axle 24 of the doffer assembly 23 thus permitting the pressure plate 62 to rest in facing engagement with the peripheral edge 26 of the doffer assembly. The capture assembly has a longitudinal axis 76 which is obliquely disposed with respect to the longitudinal axis 43 of the force receiving member 40 when it is screw-threadably mounted at the distal end 46 of the pair of inwardly convergent support members 44. This relationship is best seen by reference to FIG. 3. The capture assembly has an inside edge 77 and an outside edge 78.

As best seen by reference to FIG. 4, the capture assembly 70 is screw-threadably mounted between the pair of inwardly convergent support members 44 at the second end 42 of the force transmitting member 40, by a bolt 79 and a nut 80. The bolt 79 is screw-threadably received through the orifice 55 and through a bolt receiving aperture 73 which has been positioned in registry therewith. As should be appreciated, the plurality of bolt receiving apertures 73 formed in the proximal end 72 of the elongated main body 71 permit the capture assembly 70 to be longitudinally adjusted so that it may be used on a multiplicity of variously dimensioned doffer assemblies 23 which are found from time to time in cotton harvesters 11 of assorted design.

OPERATION

The operation of the described embodiment of the present invention is believed to be readily apparent and is briefly summarized at this point.

The apparatus 10 for imparting rotational movement to a work object and the like is best illustrated by reference to FIG. 2, wherein the work object is depicted as a doffer assembly 23. As best seen by reference to FIG. 4, the force transmitting member 40 mounts a pressure plate 62 and an adjustable capture assembly 70. As previously discussed, the apparatus imparts rotational movement to the doffer assembly 23 for the purpose of extracting a victim or other obstruction that may have become accidentally lodged internally of the cotton harvester 11. To employ the apparatus, the pressure plate is positioned in rested facing engagement against the peripheral edge 26 of two or more adjoining doffer plates 25. The capture assembly 70, having the cradle 75, is thereafter extended and appropriately adjusted, if necessary, to engage the axle 24 of the doffer assembly 23. After the cradle has engaged the axle, an operator, not shown, can thereafter exert physical force on the force transmitting member 40 thus urging the doffer assembly and the interconnected picker bar 20 to rotate in a predetermined direction for the purpose of releasing the victim or other obstruction which is lodged or otherwise jammed internally of the harvester 11.

Therefore, the apparatus 10 which is adapted to impart rotational movement to a work object and the like can be adjusted to accommodate a wide variety of different cotton harvesters rapidly and effectively prior to its utilization. The apparatus is adapted operatively to cooperate with the doffer assembly which is rotatably mounted internally of the harvester, thereby increasing the speed with which a victim or an obstruction can be extracted from the harvester; is easily maintained and stored prior to usage; and can be constructed and sold at a nominal price when compared with the numerous prior art hand tools which were previously employed for approximately the same purpose.

Although the invention has been herein shown and described in what is conceived to be the most practical and preferred embodiment, it is to be recognized that departures may be made therefrom within the scope of the invention which is not to be limited to the illustrative details disclosed.

Having described my invention, what I claim as new and desire to be secured by Letters Patent is:

1. Apparatus for imparting rotational movement to a work object and wherein the work object is a doffer assembly having an axle which mounts a plurality of doffer plates in spaced substantially equidistant attitudes, the apparatus comprising:

a handle having a longitudinal axis mounted in fixed relation between a pair of inwardly convergent support members which each have a distal end;

a pressure plate disposed in substantially parallel fixed spaced relation to the longitudinal axis of the handle and mounted in secure facing engagement on the distal ends of the inwardly convergent support members, said pressure plate further having a length dimension which is substantially equal to or greater than the distance between two adjoining doffer plates, and an interior surface operable to rest in facing engagement against the peripheral edges of at least two adjoining doffer plates of the doffer assembly to be rotated;

an adjustable capture assembly mounted on and extending between the two inwardly convergent support members and disposed at a substantially oblique attitude with, and in close proximity to, the distal ends of the inwardly convergent support members, the capture assembly further having a proximal end that is disposed between the two inwardly convergent support members, and a distal end which has formed therein a substantially arcuately shaped cradle which is dimensioned to receive and engage the axle of the doffer assembly to be rotated; and means for mounting the adjustable capture assembly in secure mating engagement between the inwardly convergent support members, the apparatus adapted to transmit force through the pressure plate and to the peripheral edges of at least two adjoining doffer plates to cause the doffer assembly to rotate in a predetermined direction.

2. The apparatus of claim 1 wherein the capture assembly has an elongated main body having a length dimension which is greater than the radius dimension of the doffer plates, and the proximal end of the capture assembly has formed therein a plurality of individual apertures which are positioned in prédetermined spaced relation.

3. The apparatus of claim 2 wherein the means for mounting the capture assembly is a bolt that is received through the two inwardly convergent support members, such bolt being screw-threadably received through an aperture formed in the proximal end of the capture assembly to mount the capture assembly in secure mating engagement therebetween the inwardly convergent support members.

4. The apparatus of claim 3 wherein the plurality of apertures formed in the adjustable capture assembly correspond with doffer assemblies of assorted dimension.

5. Apparatus for imparting rotational movement to a doffer assembly or the like rotatably mounted on an axle and mounting a plurality of substantially equidistantly spaced doffer plates which have peripheral edges, the apparatus comprising:

a force transmitting member having a longitudinal axis and mounting a transversely disposed pressure plate having a length dimension that is substantially equal to or greater than the distance between two adjoining doffer plates, the pressure plate operable to be supported on the peripheral edges of at least two adjoining doffer plates; and an adjustable capture assembly releasably mounted on the force transmitting member and having a main body with a length dimension that is greater than the radius dimensions of the doffer plates, and a substantially arcuately shaped cradle is formed in the main body, the cradle dimensioned to receive the axle whereby the apparatus is operable to transmit force to the peripheral edges of the doffer plates to which it is applied to impart rotational movement to the doffer assembly.

* * * * *

UNITED STATES PATENT AND TRADEMARK OFFICE
CERTIFICATE OF CORRECTION

PATENT NO. : 4,717,187

DATED : January 5, 1988

INVENTOR(S) : Daniel Delgado, Jr.

It is certified that error appears in the above-identified patent and that said Letters Patent is hereby corrected as shown below:

Column 3, line 54, delete "cheated" and substitute ---cleated---.

Signed and Sealed this

Twenty-sixth Day of July, 1988

*Attest:*

DONALD J. QUIGG

*Attesting Officer*

*Commissioner of Patents and Trademarks*